United States Patent [19]

Arao et al.

[11] Patent Number: 4,523,803
[45] Date of Patent: Jun. 18, 1985

[54] OPTICAL SCANNING DEVICE

[75] Inventors: Kozo Arao, Yokohama; Tadashi Sato, Kokubunji, both of Japan

[73] Assignee: Canon Kabushiki Kaisha, Tokyo, Japan

[21] Appl. No.: 350,063

[22] Filed: Feb. 18, 1982

[30] Foreign Application Priority Data

Feb. 27, 1981 [JP] Japan ................. 56-27763

[51] Int. Cl.³ .............................. G02B 5/14
[52] U.S. Cl. ................. 350/96.13; 350/96.14; 350/358
[58] Field of Search ............ 350/96.12, 96.13, 96.14, 350/358; 331/101

[56] References Cited

U.S. PATENT DOCUMENTS

| 3,514,534 | 5/1970 | Korpel | 350/358 X |
| 3,877,784 | 4/1975 | Lin | 350/96.18 |
| 4,253,060 | 2/1981 | Chen | 324/77 K |
| 4,297,704 | 10/1981 | Marom et al. | 324/77 K |
| 4,425,023 | 1/1984 | Matsumoto et al. | 350/96.13 |

FOREIGN PATENT DOCUMENTS 52-68307  6/1977  Japan.

OTHER PUBLICATIONS

Fiber-Optics CRTs And Their Use In Copy Machines For Plain-Paper Nonimpact Printing To Wurtz, J. Appl. Phot. Eng. 6, 73–77, 1980.
"Optical Channel Waveguide Arrays Coupled To Integrated Charge-Coupled Devices And Their Applications" Optical Engineering (May/Jun. 1980) vol. 19 No. 3/387–391, Boyd et al.

Primary Examiner—William L. Sikes
Assistant Examiner—Akm E. Ullah
Attorney, Agent, or Firm—Fitzpatrick, Cella, Harper & Scinto

[57] ABSTRACT

A novel optical scanning device which utilizes the light integrating technique is provided. In the device, a light beam is deflected by forming a light deflecting portion and a condensing thin film lens on a thin film waveguide path and further, the deflected light is transmitted by a transmission path bundle wider in the light exit portion thereof than in the light entrance portion thereof. The device is a compact optical scanning device which can scan a wider area at high speed.

5 Claims, 6 Drawing Figures

OPTICAL SCANNING DEVICE

BACKGROUND OF THE INVENTION

1. Field of the Invention

This invention relates to an optical scanning device suitable for application to an information recording apparatus which utilizes, for example, an electrophotographic photosensitive medium to record the output of a computer or which reproduces pre-stored image information.

2. Description of the Prior Art

A rotational polygon mirror has chiefly been used as the above-described optical scanning device. However, the rotational polygon mirror has suffered from the disadvantage that it requires a correcting means for the falling of the mirror surface or that deviations are created in the optical path system by mechanical vibration. Also, to enhance the resolving power of the printed image by an information recording apparatus using the rotational polygon mirror or to increase the output speed of such apparatus, it has been necessary to increase the number of revolutions of the polygon mirror to several tens of thousandths of r.p.m. and it has not been easy to rotate the polygon mirror stably. In addition, the necessity of enhancing the accuracy of the polygon mirror has unavoidably led to a bulky size and accordingly heavy weight of the device, and the required high accuracy of shape of the polygon mirror itself and the required high accuracy of the driver therefor have resulted in a high cost of the device.

On the other hand, devices using an acoustic optical deflector or an electric optical deflector instead of a rotational polygon mirror to make the devices compact are known. An example of such a device is disclosed in U.S. Pat. No. 3,514,534. However, these optical scanning devices have a small deflection angle in spite of having a feature that they are capable of high-speed deflection, and therefore, commercially available information recording apparatus using such optical scanning devices are not yet known.

The assignee hereof developed a novel beam spot point scanning device by utilizing the thin film waveguide path light integrating technique and proposed it in U.S. application Ser. No. 228,744 filed Jan. 27, 1981 now U.S. Pat. No. 4,425,023 issued Jan. 10, 1984. This beam spot point scanning device is an epoch-making one which is compact and capable of high-speed scanning, but the scanning angle thereof is not sufficient for the device to be used in an information recording apparatus.

There is also an information recording apparatus using an optical fiber tube (OFT), but this is disadvantageous as a high-speed, high-quality information recording apparatus in respect to resolving power and intensity of light.

SUMMARY OF THE INVENTION

It is an object of the present invention to provide a compact, inexpensive optical scanning device which can scan a wide area at high speed and at high quality.

This device scans a light beam by forming a light deflecting portion and a condensing thin film lens on a thin film waveguide path and uses a transmission path bundle optically coupled to the thin film waveguide path in the beam spot scanning surface and wider in the light exit portion thereof than in the light entrance portion thereof to transmit the light beam, thereby substantially enlarging the scanning width. By such a construction, the present invention realizes an optical scanning device which is suitable for application to an information recording apparatus and which scans a wide scanning width at high speed and at high quality.

The invention will become more fully apparent from the following detailed description thereof taken in conjunction with the accompanying drawings.

DESCRIPTION OF THE PREFERRED EMBODIMENTS

Figure 1:
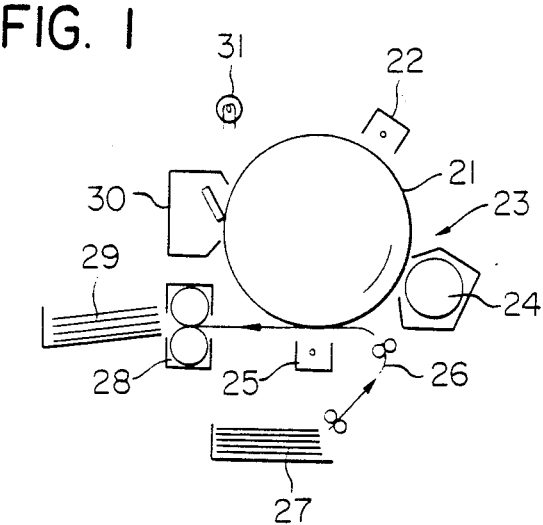
FIG. 1 is a cross-sectional view showing an example of the information recording apparatus to which is applicable the optical scanning device of the present invention.

Referring to FIG. 1 which shows an example of the information recording apparatus to which the optical scanning device according to the present invention is applicable, reference numeral 21 designates an electrophotographic photosensitive drum, reference numeral 22 denotes a primary charger, reference numeral 23 designates an exposure station whereat the photosensitive medium 21 is exposed to the beam spot from an optical scanning device to be described, reference numeral 24 designates a developing device, reference numeral 25 denotes an image transfer charger, reference numeral 26 designates a transfer medium conveyed in the direction of the arrow, reference numeral 27 denotes a paper feed stacker, reference numeral 28 designates a fixing device, reference numeral 29 denotes a paper discharge stacker, reference numeral 30 designates a cleaner, and reference numeral 31 denotes a discharging exposure lamp. The photosensitive drum 21 is rotated in the direction of the arrow, and uniformly charged by the primary charger 22 and exposed to beam-spot-like information light at the exposure station 23, whereby an electrostatic latent image is formed on the photosensitive drum. This latent image is visualized into a toner image by the developing device 24, and the visualized image is transferred onto the transfer medium 26 by the image transfer charger 25, whereafter the transferred image on the transfer medium is fixed by the fixing device 28 and the transfer medium is discharged onto the stacker 29. On the other hand, any toner remaining on the drum 21 after the image transfer is collected by the cleaner 30 and the drum 21 is electrostatically uniformized by the discharging lamp 31, thus completing one cycle.

The present invention is suited for the exposure means of information light in the recording apparatus as shown in FIG. 1 and a first essential portion of an embodiment of the invention will hereinafter be described by reference to FIGS. 2 and 3. These figures show a typical example of the novel scanning light forming optical integrated circuit proposed by the applicant, as previously mentioned.

Figure 2:
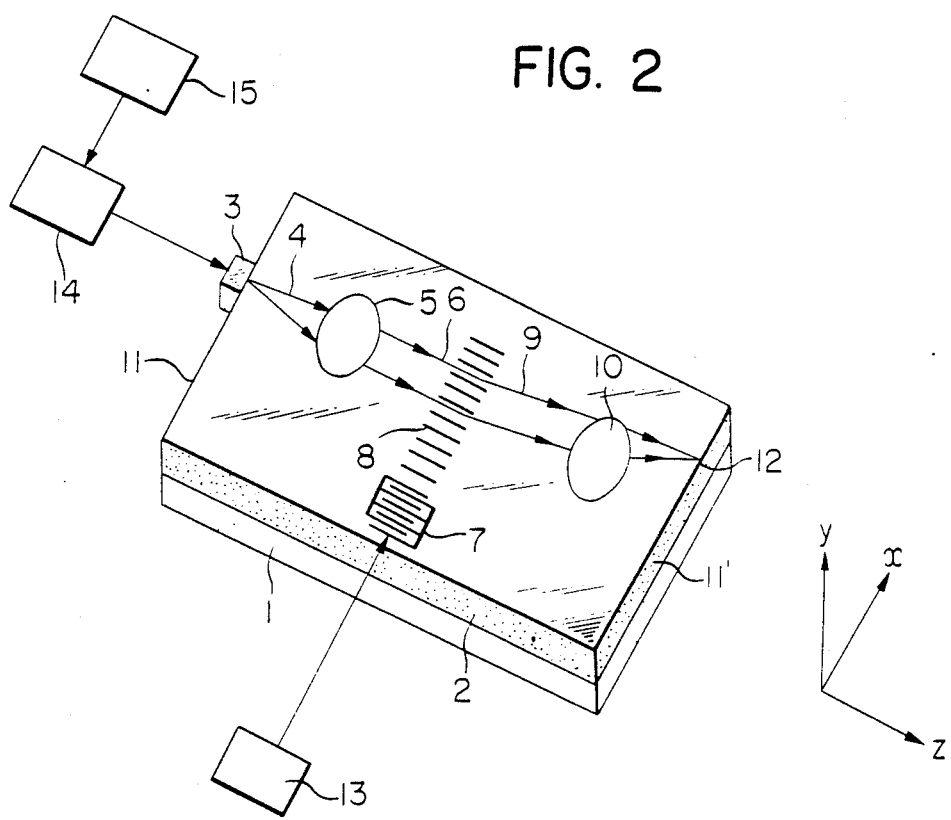
FIG. 2 is a perspective view schematically showing a beam spot scanning device which is a first essential portion of the present invention.

Now, in the optical integrated circuit of FIG. 2, for example, a semiconductor laser 3 as a coherent light source is provided in proximity to the end surface 11 of a thin film waveguide path (light transmitting path) 2 having a thickness of the order of 1 μ formed by diffusing Ti, for example, over the surface portion of a substrate 1 of LiNbO₃. The divergent laser light 4 incident from the end surface 11 onto the thin film waveguide path 2 is made into a parallel light beam 6 by a thin film lens 5. The light beam 6 travelling along the thin film waveguide path is caused to create a diffracting action and is deflected by an optical diffraction grating formed by an ultrasonic wave surface elastic wave 8 excited by a comb-tooth-like electrode 7 to which is applied the voltage from a high-frequency wave voltage source 13 provided on a portion of the thin film waveguide path 2 as by evaporation. This deflected light beam 9 is further condensed or concentrated by a thin film lens 10 so as to form a beam spot 12 on the end surface 11' of the thin film waveguide path. That is, the end surface 11' is formed at a position substantially coincident with the focal plane of the thin film lens 10 having a power in x - z plane, and the condensed light beam is condensed onto or near the end surface 11' in x direction and emerges therefrom. The dimensions of the light beam are limited by the thickness of the thin film waveguide path in the y direction perpendicular to the x - z plane. In such a construction with the beam spot scanning element of FIG. 2 (and also of FIG. 3), the frequency of the high-frequency wave voltage of the voltage source 13 applied to the aforementioned comb-tooth-like electrode 7 is periodically varied to periodically vary the wavelength of the ultrasonic wave surface elastic wave on the thin film waveguide path, thereby controlling the deflection angle of the light beam 9 and obtaining a scanning beam spot on the exit end surface.

Figure 3:
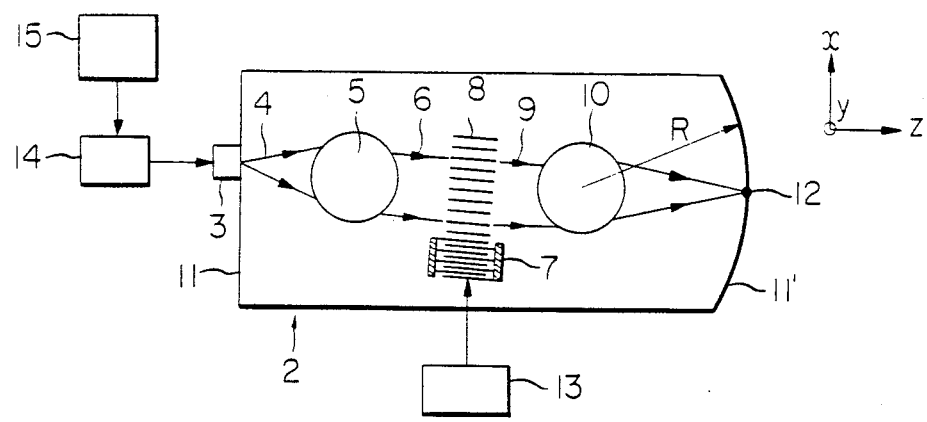
FIG. 3 is a plan view of the beam spot scanning device having the exit end surface of the waveguide path thereof curved so that the diameter of the beam spot does not vary during scanning.

FIG. 3 shows an arrangement in which any focus deviation created in the beam spot scanning element of FIG. 2 when the deflection angle of the light beam 9 has become great is prevented. That is, in FIG. 2, the light exit end surface 11" is formed so as to be coincident with the focal plane of the thin film lens 10. Accordingly, the end surface 11' is a cylindrical surface concentric with the thin film lens 10. In this manner, focus deviation can be prevented, but where the deflection angle of the light beam 9 is not required to be so great a one, the focus deviation is of a negligible degree even if the end surface 11' is formed as a planar surface as shown in FIG. 2.

In FIGS. 2 and 3, modulation of light, namely, formation of information light, is achieved either by adopting a well-known method of ON-OFF-controlling a laser driving circuit 14 by a recorded electrical signal generating circuit 15 or by controlling the voltage applied to the electrode 7 corresponding to a recorded electrical signal. Also, in FIGS. 2 and 3, the thin film lenses 5 and 10 may be so-called luneburg lenses or geodesic lenses taking a spherical shape (circular shape if depicted in plan view) slightly protuberant convexly or slightly depressed concavely on the thin film waveguide path 2.

Description will hereinafter be made of embodiments of the optical scanning device of the present invention having the above-described optical integrated circuit as the essential portion.

Figure 4:
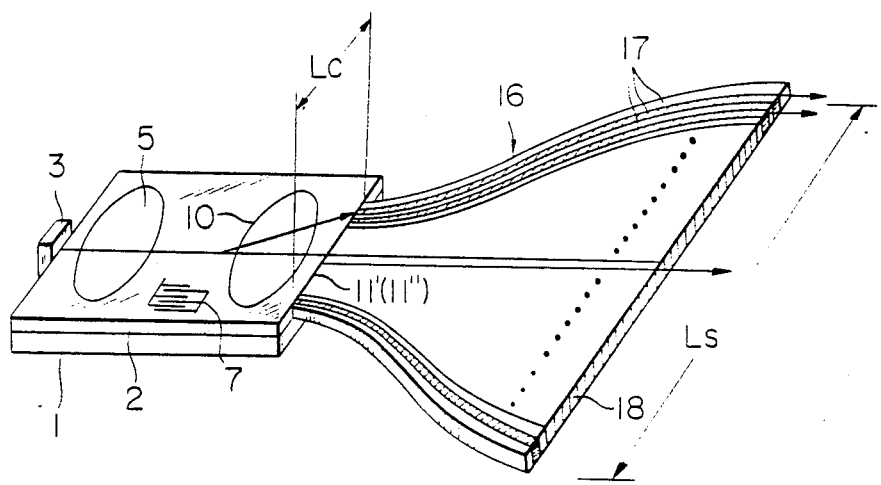
FIG. 4 is a perspective view showing a first embodiment of the present invention.

In FIG. 4, reference numeral 16 designates a waveguide path bundle comprising a great number of densely bundled thin waveguide paths. Each of the waveguide paths is constructed such that the opening of the light exit end surface is larger than the opening of the light entrance end surface, and the waveguide paths are integrated and are arranged with their respective entrance end surfaces and their respective exit end surfaces being densely bundled on a plane. The entrance end surface of the waveguide path bundle 16 constructed with the entrance end surfaces of the respective waveguide paths 17 integrated rectilinearly is optically joined to the beam spot forming surface 11' of the hereinbeforedescribed optical integrated circuit. Where the waveguide path bundle is constructed by densely arranging the entrance end surfaces of the waveguide paths 17 on a plane in accordance with a concave surface having the same radius of curvature as the cylindrical shape of the exit end surface 11" of the optical integrated circuit of FIG. 3, this waveguide path bundle can be used with its entrance end surface being joined to the end surface 11" of the optical integrated circuit of FIG. 3. In any case, the scanning beam spot formed on the surface 11', or 11" enters one of the waveguide paths 17 of the waveguide path bundle 16 and is transmitted therethrough and exits from the exit end surface. Assuming that the scanning width of the beam spot on the end surface 11' or 11" of the optical integrated circuit (the width of the entrance end surface of the waveguide path bundle 16 in the scanning direction is equal to or somewhat greater than the said scanning width, and the beam spot scanning area on the end surface 11' or 11" and the entrance end surface of the waveguide path bundle 16 are joined together so that the entire area of said entrance end surface covers the entire beam spot scanning area) is Lc and that the beam spot scanning width on the exit end surface 18 of the waveguide path bundle 16 is Ls, Ls can be chosen to be several tens of times Lc. Accordingly, this sufficiently covers the disadvantage that the scanning angle of the aforementioned optical integrated circuit is small, and substantially enlarges the scanning width of the light beam.

The light exit end surface of the waveguide path bundle 16, when used in the information recording apparatus as shown and is positioned FIG. 1, is disposed at the exposure station 23 in proximately opposite to the photosensitive drum 21.

The waveguide path bundle 16 may be provided either by bundling optical fibers greater in diameter of the exit end surface than in diameter of the light entrance end surface or by etching a plastic film such as polyethylene. If each waveguide path is made into a clad type as by ion beam driving, the transmitting characteristic thereof will become much better. Further, such a waveguide path bundle may also be formed by the use of a selective light polymerization method. This method comprises placing a mask having the pattern of the waveguide path bundle 16 depicted thereon upon a high molecular film such as bisphenol Z polycarbonate containing a monomer such as acrylic acid methyl, applying ultraviolet rays thereto to cause the monomer in the film to selectively polymerize and fix and inducing a refractive index distribution therein (in the aforementioned example of the material, the refractive index is changed from 1.59 to 1.57 by application of ultraviolet ray), and forming waveguide paths corresponding to the pattern. According to this method, a waveguide path bundle having a complicated shape can be formed with ease.

Figure 5:
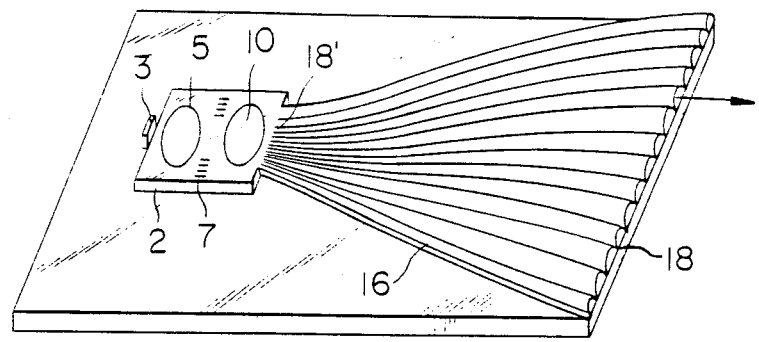
FIG. 5 is a perspective view showing a second embodiment of the optical scanning device according to the present invention in which the waveguide path of the beam spot scanning portion and the waveguide path bundle transmitting a deflected light beam are formed integrally with each other.

FIG. 5 shows another embodiment of the present invention. In this embodiment, the thin film waveguide path 2 and waveguide path bundle 16 of the optical integrated circuit as described in connection with FIGS. 2 and 3 are integrally formed on a substrate 1 of $LiNbO_3$ or the like. According to this example, the thin film waveguide path 2 and the waveguide path bundle 16 are formed of the same material such as $Al_2O_3$ by evaporation. If the above-described optical integrated circuit and waveguide path bundle are thus integrally formed by the use of a patterning method such as etching or evaporation, the joint loss in the exit end surface of the optical integrated circuit and in the entrance end surface of the waveguide path bundle which presents a problem in the example of FIG. 4 can be remarkably reduced. In the present example, the entrance portion 18' of the waveguide path bundle is provided at a position corresponding to 11' or 11" of the thin film waveguide path 2 in FIG. 2 or 3.

As an example of the numerical value of the above-described optical scanning device, if a waveguide path bundle of 5 $\mu$m pitch (substantially coincident with the dimension at the entrance of each waveguide path) is used on the surface 11' or 11" or at a location corresponding thereto when the focal length of the condenser thin film lens 10 is 30 mm and $Lc \approx 2$ mm, the number of waveguide paths 17 is 400. This is an amount of decomposition capable of being sufficiently decomposed by a thin film deflecting element. Ls is determined by the necessary resolving power of the recording apparatus. Ls is 40 mm if 10 dots/mm is necessary. The gap between the exit surface 18 and the photosensitive drum may be of the order of 100 $\mu$m, but when the beam spot pitch on the drum surface is 10 dots/mm, said gap is 100 $\mu$m and therefore need not be set so strictly. Further, if a laser of wavelength 800 nm and output 10 mW is used, the quantity of light of the output beam will be about 1/10 due to the loss in the optical integrated circuit 2 and the waveguide path bundle 16, but when Ls=40 mm and the drum peripheral speed is 200 mm/sec., 12.5 $\mu J/cm^2$ can be secured as the quantity of light on the photosensitive drum and, with a photosensitive material such as $Se_{1-x}Te_x$, $AS_2Se_3$ or In-doped, this is a sufficient quantity of light for the wavelength 800 mm. Also, the beam spot scanning cycle for the above-mentioned example of the numerical value is 2 KHz and this is much lower than the response speed of the surface elastic wave. The switching delay of the laser can be virtually neglected.

Figure 6:
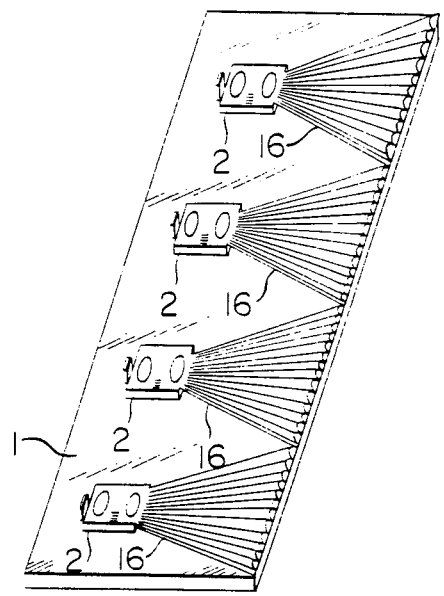
FIG. 6 is a perspective view showing a third embodiment of the optical scanning device according to the present invention in which a plurality of waveguide path bundles for transmitting the deflected light beam formed integrally with the waveguide path of the beam spot scanning portion are formed on the same substrate.

FIG. 6 shows still another embodiment of the present invention. In this embodiment, four pairs of thin films 2 and waveguide path bundles 16 integrally formed as in the example of FIG. 5 are laterally integrally constructed on a substrate 1. The arrangement direction of said pairs is the same as the axial direction of the photosensitive drum when this embodiment is used with the information recording apparatus as shown in FIG. 1.

The high-frequency wave from the same high-frequency wave voltage generating circuit is applied to the comb-tooth-like electrode 7 of each optical integrated circuit 2, and a signal to be recorded on the area of the photosensitive medium to which each waveguide path bundle 16 is opposed, is applied to each semiconductor laser and modulates the same. (That is, each waveguide path bundle 16 is opposed, to the axially adjacent areas of the photosensitive medium.) By this, an axially, rectilinearly continuous image can also be formed on a photosensitive medium which is wide in the axial direction.

According to the present example, 4,000 decomposed beam spots are obtained on the scanned surface and therefore, by using the present example, it is possible to realize an information recording apparatus having a resolving power of 13 pel/mm or more and permitting lateral feeding of A4 size. Also, since the scanning surfaces of the four beam spots are entirely on the same line, the designing and manufacturing of the information recording apparatus becomes easier than the simple use of a plurality of known scanning devices.

As described above, the present invention is a very compact optical scanning device of low cost which device utilizes the light integrating technique, can accomplish scanning of high quality at high speed and realizes a great scanning width.

What we claim is:

1. An optical scanning device comprising:
   a substrate;
   a thin film waveguide path for propagating a light beam, said thin film waveguide path being formed on said substrate;
   a waveguide path bundle formed integrally with and of the same material as said thin film waveguide path on said substrate, each waveguide path of said waveguide path bundle having a light entrance portion and a light exit portion, and being wider in the light exit portion thereof than in the light entrance portion thereof onto which the light beam propagated in said thin film waveguide path in incident;
   first means for deflecting a light beam propagated in said thin film waveguide path; and
   second means for condensing a light beam deflected by said first means to guide deflected light beam onto said light entrance portion of said waveguide path bundle.

2. A device according to claim 1, wherein said second means includes a thin film lens formed on said waveguide.

3. A device according to claim 2, wherein said thin film lens has a curved condensed surface and the light entrance portion of said waveguide path bundle is formed in a curved shape that is in conformity with said curved condensed surface of said thin film lens.

4. A device according to claim 1, wherein said first means includes a comb-tooth-like transducer for exciting an acoustic wave in said waveguide, and means for applying to said transducer a signal having a frequency which varies.

5. A device according to claim 1, comprising a plurality of said thin film waveguide paths and a plurality of said waveguide path bundles formed on said substrate and the light exit portions of said plurality of said waveguide path bundles are arranged in a rectilinearly continuous manner.

* * * * *

UNITED STATES PATENT AND TRADEMARK OFFICE
CERTIFICATE OF CORRECTION

PATENT NO. : 4,523,803                           Page 1 of 2

DATED      : June 18, 1985

INVENTOR(S) : KOZO ARAO, ET AL.

It is certified that error appears in the above-identified patent and that said Letters Patent is hereby corrected as shown below:

```
Col. 1, line 13, change "chiefly" to --mainly--;
        line 43, delete "point";
        line 47, delete "point";
        line 55, change "in" to --with--.

Col. 3, line 59, delete "a one".

Col. 4, line 54, change "in" to --and is positioned--.

Col. 5, line 53, change "AS2Se3" to --As2Se3--.

Col. 6, line 30, delete "path";
        line 31, delete "path";
        line 33, delete "path";
        line 35, delete "path" (both occurrences);
        line 36, delete "path";
        line 40, change "in" (second occurrence) to --is--;
        line 43, delete "path";
        line 44, change "a" to --said--;
        line 45, between "guide" and "deflected" insert --said--
        line 47, delete "path";
```

UNITED STATES PATENT AND TRADEMARK OFFICE
CERTIFICATE OF CORRECTION

PATENT NO. : 4,523,803

DATED : June 18, 1985

INVENTOR(S) : KOZO ARAO, ET AL.

It is certified that error appears in the above-identified patent and that said Letters Patent is hereby corrected as shown below:

```
Col. 6, line 53, delete "path";
        line 62, delete "paths";
        line 63, delete "path";
        line 65, delete "path".
```

Signed and Sealed this

Twenty-fifth Day of March 1986

[SEAL]

Attest:

DONALD J. QUIGG

Attesting Officer

Commissioner of Patents and Trademarks